United States Patent [19]

Cheung

[11] Patent Number: 4,710,856
[45] Date of Patent: Dec. 1, 1987

[54] VANITY MIRROR ASSEMBLY

[75] Inventor: Kee K. Cheung, Kowloon, Hong Kong

[73] Assignee: Chi Kuan Manufactory Limited, Hong Kong, Hong Kong

[21] Appl. No.: 882,706

[22] Filed: Jul. 7, 1986

[51] Int. Cl.⁴ .................... B60Q 1/00; G02B 17/00
[52] U.S. Cl. .................. 362/74; 296/97 R; 350/277; 362/135; 362/137
[58] Field of Search .......... 362/135, 137, 74, 396; 350/604, 277; 296/97 C, 97 R

[56] References Cited

U.S. PATENT DOCUMENTS

| | | | |
|---|---|---|---|
| 2,097,419 | 10/1937 | Schmidt | 350/277 |
| 3,375,364 | 3/1968 | Marcus | 350/277 |
| 4,213,169 | 7/1980 | Kempkers | 362/74 |

FOREIGN PATENT DOCUMENTS

| | | | |
|---|---|---|---|
| 143594 | 6/1985 | European Pat. Off. | 350/606 |
| 1059898 | 11/1953 | France | 350/277 |

*Primary Examiner*—Douglas Hart
*Attorney, Agent, or Firm*—Barnes, Kisselle, Raisch, Choate, Whittemore & Hulbert

[57] ABSTRACT

A vanity mirror assembly comprising a mirror mounted on the front face of a mirror support, sometimes referred to as the mirror body proper. A cover is mounted on the mirror body proper for sliding movement from a closed position overlying and concealing the mirror to an open position exposing the mirror for use. The mirror is illuminated by one or more light bulbs and an electric circuit housed in the mirror body proper. The circuit is closed when the cover is in open position and is opened when the cover is closed.

9 Claims, 14 Drawing Figures

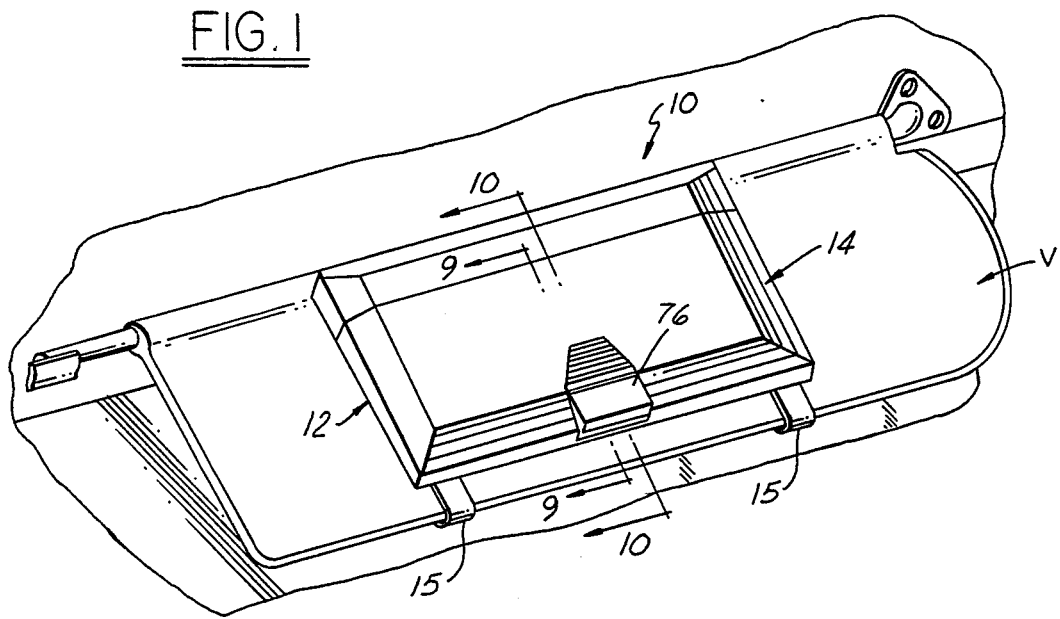
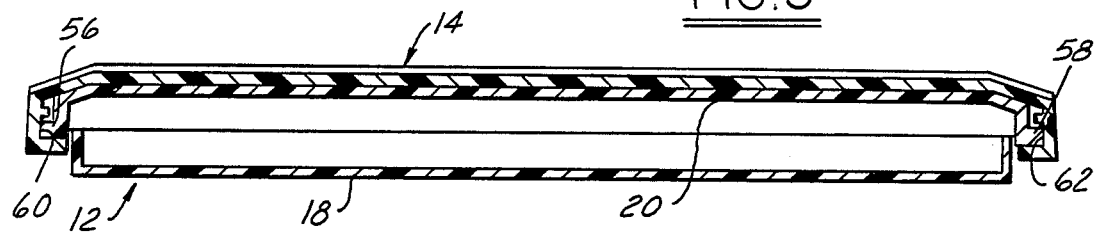
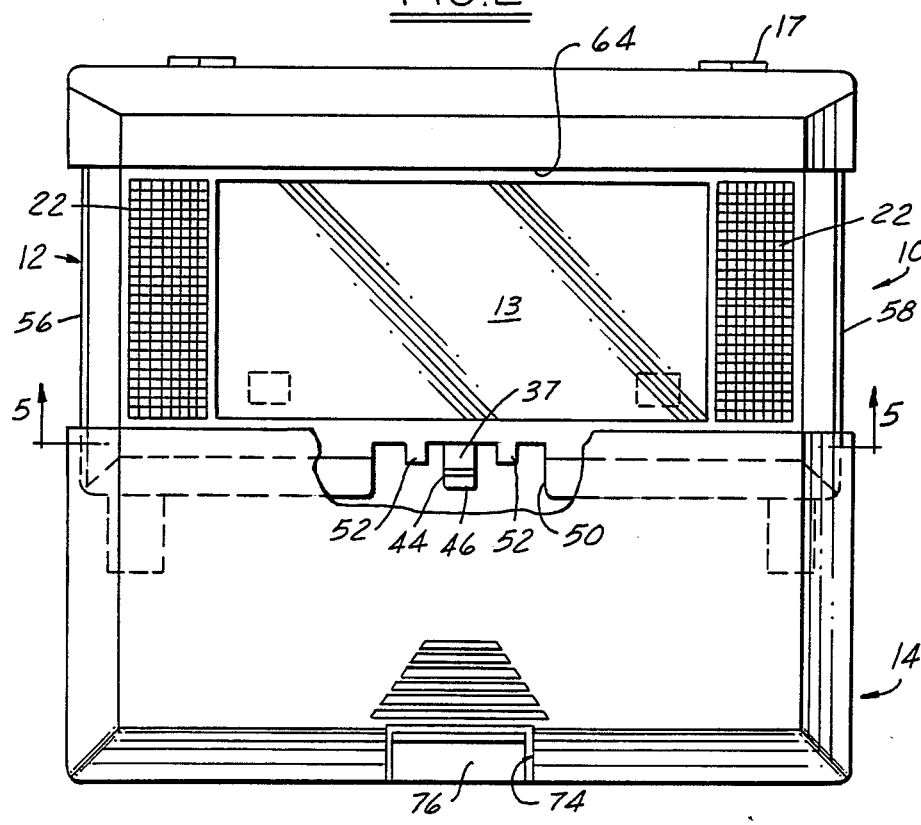
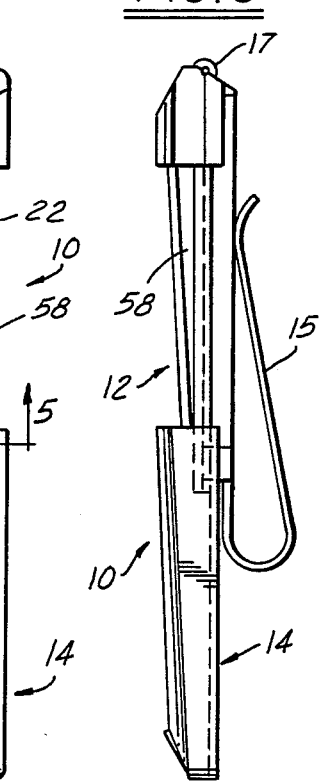

VANITY MIRROR ASSEMBLY

This invention relates generally to vanity mirrors and refers more particularly to a vanity mirror assembly adapted to be attached to the visor of an automobile.

BACKGROUND AND SUMMARY OF THE INVENTION

This invention improves on existing vanity mirrors of the type adapted to be attached to automobile visors, by employing a mirror cover which opens by sliding movement along tracks on the mirror support or mirror body proper. Conventional car visor vanity mirrors presently in use employ mirror covers supported by a hinge for pivotal movement about an axis parallel to the length of the mirror, and held open by a spring. These conventional vanity mirrors can be a safety hazard because of the risk that the user will bump his head against an open mirror cover if the vehicle should come to an abrupt stop.

This invention eliminates the above safety hazard and also makes it more convenient to use the mirror. When the car visor is pulled down to a vertical position, the vanity mirror will also be presented in a like position. The user may simply release the cover, permitting it to slide down on its tracks by gravity to an open position, thereby revealing the entire surface of the mirror.

In its simplest terms, the vanity mirror assembly comprises a mirror, a mirror support, sometimes referred to as the mirror body proper, having a front surface on which the mirror is mounted, a cover for the mirror, and means mounting the cover, on the mirror support or body proper for sliding movement along a path generally in the plane of the mirror from a closed position overlying and concealing the mirror to an open position exposing the mirror for use.

Preferably the vanity mirror assembly has means for providing illumination including one or more light bulbs and an electric circuit which may be housed in the mirror body proper. Circuit control means are provided for opening the circuit in the closed position of the cover and for closing the circuit when the cover is open.

These and other objects of the invention will become more apparent as the following description proceeds, especially when considered with the accompanying drawings.

BRIEF DESCRIPTION OF THE DRAWINGS

FIG. 1 is a perspective view of a vanity mirror assembly constructed in accordance with my invention, shown mounted on the visor of an automobile and with its cover closed.

FIG. 2 is a front elevational view of the vanity mirror assembly with the cover shown in open position.

FIG. 3 is a side edge view of the vanity mirror assembly.

FIG. 5 is a sectional view taken on the line 5—5 in FIG. 2.

DETAILED DESCRIPTION

Figure 4:
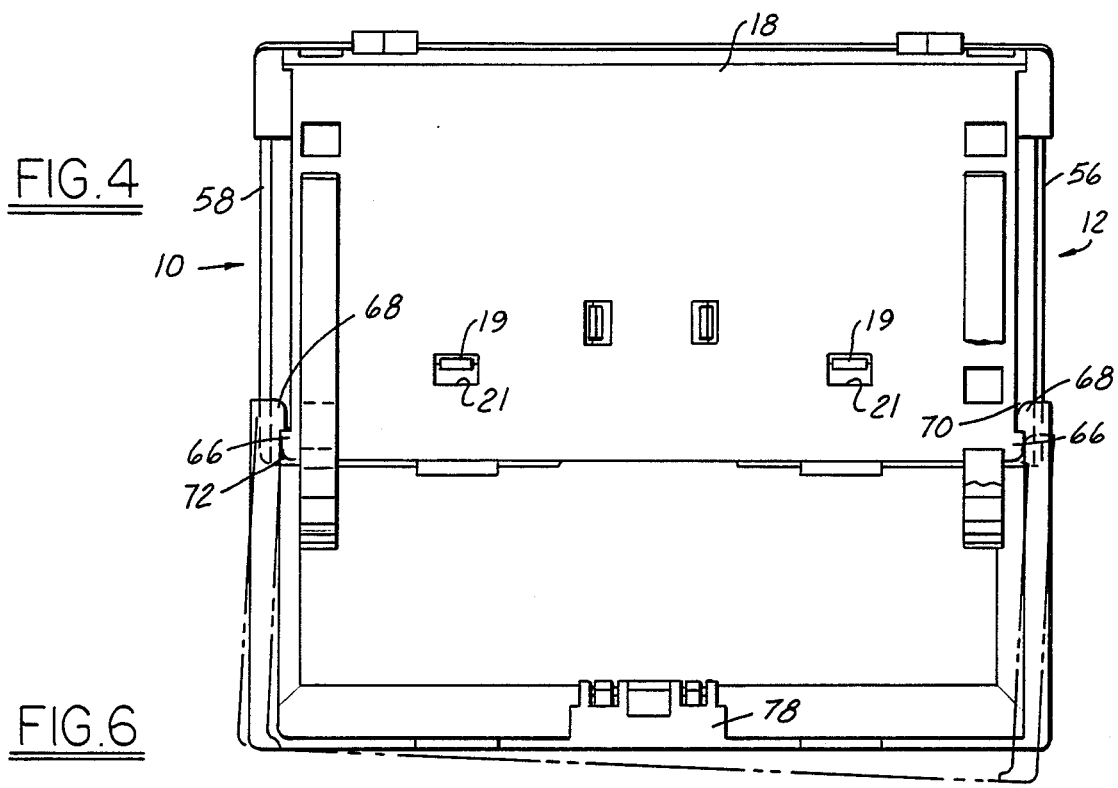
FIG. 4 is a rear elevational view of the vanity mirror assembly shown with the cover open. This view also shows in dot-dash lines the cover being separated from the mirror support or mirror body proper.
Figure 6:
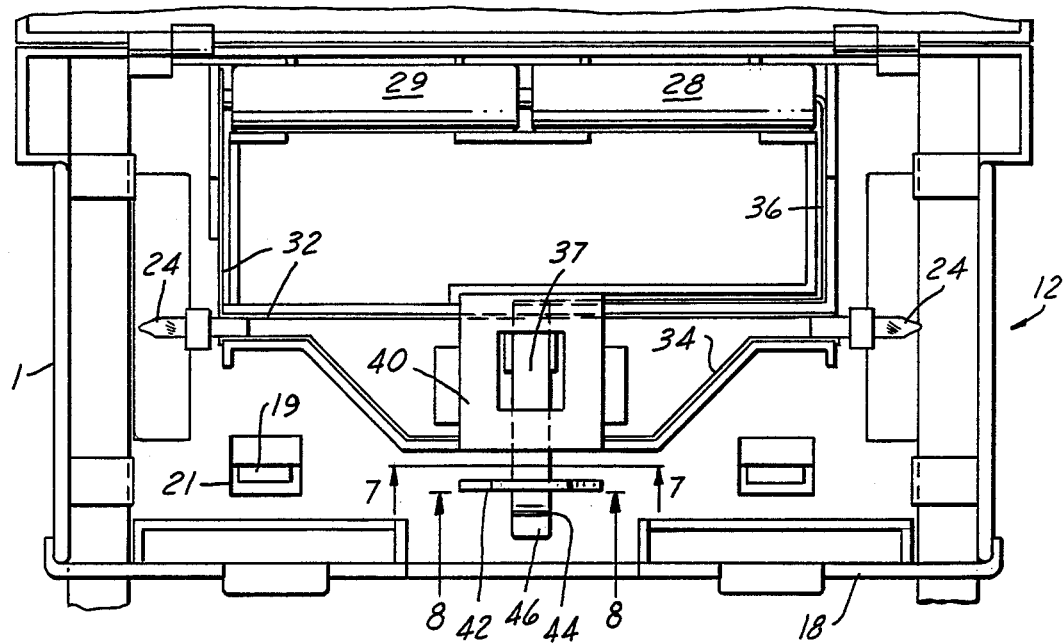
FIG. 6 is a fragmentary view of the mirror body proper with the cover swung to open position.
Figure 7:
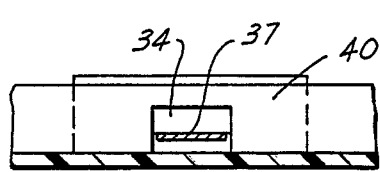
FIG. 7 is a fragmentary sectional view taken on the line 7—7 in FIG. 6.
Figure 8:
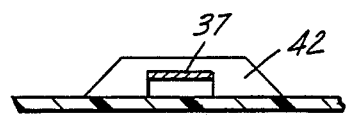
FIG. 8 is a fragmentary sectional view taken on the line 8—8 in FIG. 6.

Referring now more particularly to the drawings, the vanity mirror assembly is generally designated 10 and comprises a mirror support or mirror body proper 12, a mirror 13 affixed to the front surface of the mirror body proper, a cover 14, and clips 15 by means of which the vanity mirror assembly may be releasably attached to an automobile visor V as shown in FIG. 1.

The mirror body proper 12 is a casing of generally flat rectangular form and comprises a dished rectangular back section 18 and a similarly dished rectangular front section 20 hinged at 17 at the top of the back section with their dished sides confronting one another to provide an interior space when the casing is closed. Mirror 13 is secured as by adhesive in a recess 16 in front section 20. The casing 12 is held closed by suitable means such as by snaps 19 on the front section 20 engaging openings 21 in the rear section. The clips 15 are mounted on back casing section 18.

Figure 14:
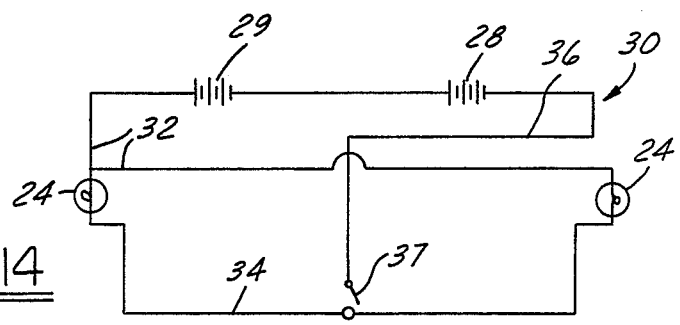
FIG. 14 is an electrical diagram showing the circuitry for the illuminating means within the mirror body proper.

Inside the casing 12 are means providing illumination through the translucent portions 22 of the front casing section 20 on opposite sides of the mirror. Such means may include two light bulbs 24 one positioned behind each of the translucent sections and held in place on the back section by suitable retaining elements. Dry cell batteries 28 and 29 are secured in place by retainers 26 on the back section for supplying electrical energy to the light bulbs through a circuit 30. The circuit 30 has electrically conducting circuit elements 32, 34 and 36 of copper strip material, for example. The head of battery 28 is shown in electrical contact with the base of battery 29. Circuit element 32 extends from the head of battery 29 to one side of each bulb. Circuit element 34 is in electrical contact with the opposite sides of the bulbs. Circuit element 36 extends from the base of battery 28 and has a portion 37 which acts as a switch moveable into and out of contact with circuit element 34 to close and open the circuit. The switch element 37 is a flexible resilient member one end of which is held down on the back section of the casing by a retainer 38. Switch element 36 extends from retainer 38 at an angle to the back section under bridges 40 and 42. When the cover is open, the switch element 36 is in light pressure contact with the bridge 42 and also with the circuit element 34 which extends across bridge 40, closing circuit 30. The switch element at its free end has a latching ridge 44 terminating in an inclined lead-in or camming portion 46 about which more will be said hereinafter as this description proceeds. Circuit 30 is diagrammatically shown in FIG. 14.

The front casing section 20 has a central recess 50 along its edge opposite the hinge beyond which the free end of the switch element 37 extends. The recess has abutments 52 and 54 on opposite sides of the switch element 37.

Parallel tracks 56 and 58, formed by the side edges of the front and back casing sections, extend along the side edges of the casing at right angles to the hinge 17. The opposite side edges of the cover 14 have parallel grooves 60 and 62 forming tracks which slidably receive the tracks 56 and 58, enabling the cover to slide from the closed position of FIG. 1 in which the mirror 13 is concealed to the open position of FIG. 2 in which the mirror is exposed. The top portion of the front section 20 is thickened to form an abutment 64 determining the closed position of the cover 14. There is an enlargement 66 on the casing at the bottom of each casing track 56, 58. There is also an enlargement 68 on the cover 14 at the top of each cover track 60, 62. Enlargements 66 and 68 contact each other on both sides of the assembly to provide stops limiting the opening movement of the cover to the position shown in FIGS. 2 and 4. The casing 12 and cover 14 are preferably formed of a somewhat flexible plastic material permitting the cover to be flexed sufficiently (see dot-dash lines in FIG. 4) to disengage the tracks when it is desired to separate the cover from the casing. The tops of the cover enlargements 68 are preferably beveled or wedge-shaped as shown at 70 and the bottoms of the casing enlargements 66 may be similarly formed as shown at 72 to permit the enlargements to cam over one another during assembly.

Figure 10:
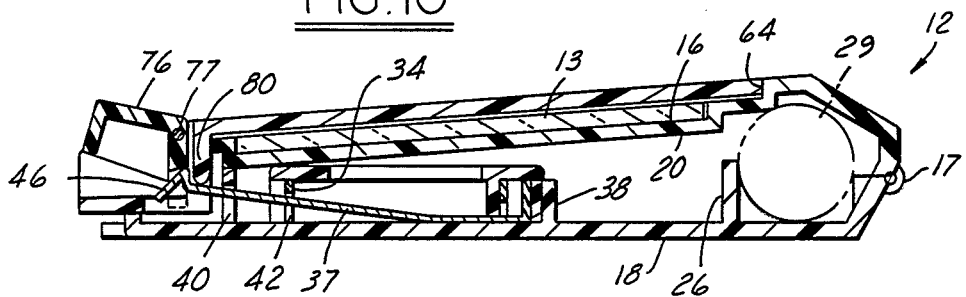
FIG. 10 is a sectional view on the line 10—10 in FIG. 1.

The cover 14 has a central recess 74 in its lower edge in which a latch release member 76, more fully described hereinafter, is disposed. The latch release member is pivoted on a transverse pin 77 carried by a housing 78 on the cover. The housing 78 has a lip 80 which projects into the casing through recess 50 in front casing section 20 preferably at substantially a right angle to the path of cover movement along tracks 56-62. Lip 80 is adapted to engage behind the latching ridge 44 when the cover is closed. The lower end of lip 80 is rounded to have a camming action on ridge 44 during opening of the cover, as explained hereinafter. Latching ridge 44 preferably is at substantially a right angle to the path of cover movement. When the lip 80 engages ridge 44 in the closed position of the cover, it flexes the switch element 37 to the FIG. 10 position in which the switch element moves out of contact with circuit element 34, thereby opening the circuit.

The latch release member 76 has extensions 82 opposed to the abutments 52 on the front casing section 20.

Figure 9:
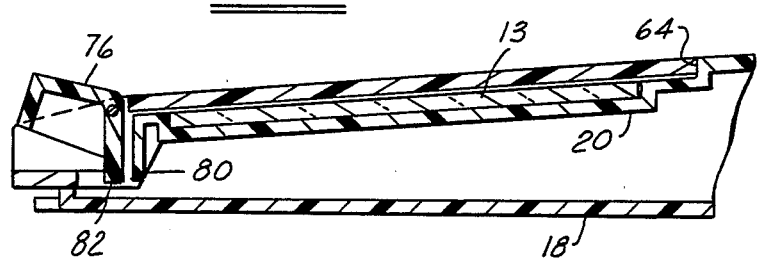
FIG. 9 is a fragmentary sectional view taken on the line 9—9 in FIG. 1.
Figure 11:
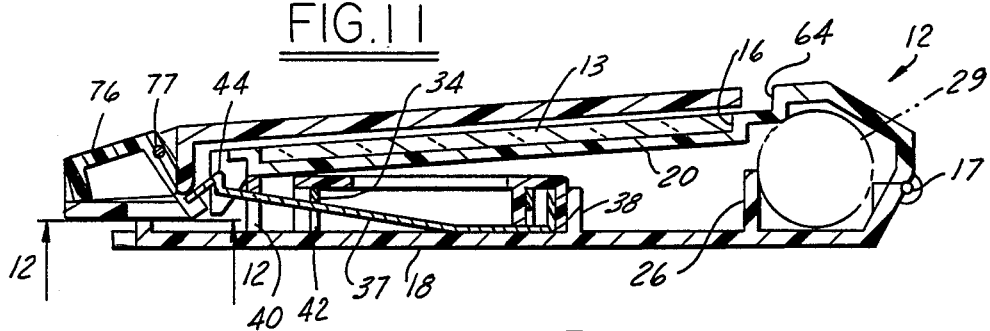
FIG. 11 is similar to FIG. 10 but shows the parts in a different position.
Figure 12:
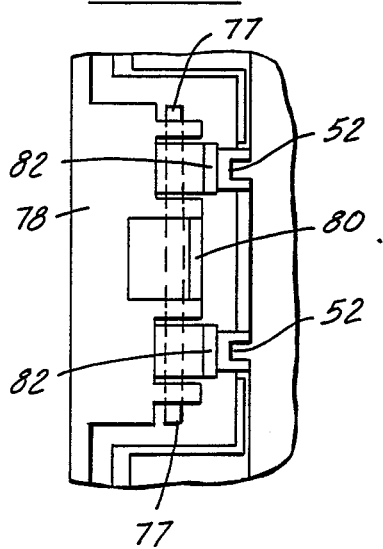
FIG. 12 is a fragmentary view taken on the line 12—12 in FIG. 11.
Figure 13:
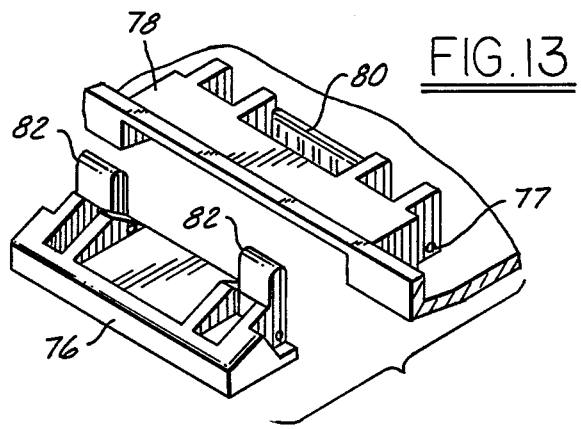
FIG. 13 is an exploded view of parts of the mechanism shown in FIG. 12.

When it is desired to use the vanity mirror, the car visor is pulled down to vertical position, presenting the vanity mirror assembly in a like position. The mirror cover is, of course, closed and the parts are in the position shown in FIGS. 9 and 10 in which the cover is latched closed by reason of cover lip 80 being engaged behind ridge 44. As stated above, the circuit 30 in this position of the cover is open. The user will simply depress the latch release member 76 to the FIG. 11 position, causing the extensions 82 to contact and push against abutments 52 on the front casing section 20. This initiates opening movement of the cover. The rounded end of lip 80 cams past the latching ridge 44 so that the cover may slide down the tracks to open position along a path generally parallel to the plane of the mirror, thereby revealing the entire surface of the mirror. The switch element 37 when thus released flexes into contact with circuit element 34 to close the circuit 30 and energize the light bulbs, thereby illuminating the mirror.

After use, the cover 14 is merely slid to the closed position of FIG. 1. The rounded end of lip 80 engages lead-in or camming portion 46 of switch element 37, latching ridge 44 snapping behind lip 80 to latch the cover closed and open circuit 30. The mirror assembly and visor may then be swung back to the generally horizontal, stored position.

What is claimed:

1. A vanity mirror assembly adapted to be mounted on an automobile visor or the like, comprising a mirror, a mirror support having a front surface on which said mirror is mounted, a cover for said mirror, and means mounting said cover on said mirror support for sliding movement along a path generally parallel to the plane of said mirror from a closed position overlying and concealing said mirror to an open position exposing said mirror for use, said means mounting said cover on said mirror support comprising tracks on opposite sides of said cover slidably engaged with tracks on opposite sides of said mirror support, said cover being made of a material which is sufficiently flexible to permit its tracks to be manually disengaged from the tracks of said mirror support so that said cover can be detached from said mirror support 2. A vanity mirror assembly adapted to be mounted on an automobile visor or the like, comprising a mirror, a mirror support having a front surface on which said mirror is mounted, a cover for said mirror, means mounting said cover on said mirror support for sliding movement along a path generally parallel to the plane of said mirror from a closed position overlying and concealing said mirror to an open position exposing said mirror for use, releasable latch means for retaining said cover in its closed position, said releasable latch means comprising a member on said mirror support having a latching ridge, and a lip on said cover adapted to engage behind said ridge in the closed position of said cover.

3. A vanity mirror assembly as defined in claim 2, wherein said member is flexible and has an inclined portion adjacent said ridge, said lip, upon movement of said cover towards closed position, camming past said inclined portion to engage behind said ridge as aforesaid.

4. A vanity mirror assembly as defined in claim 3, including a latch release member pivoted on said cover, said latch release member having a portion engageable, in the closed position of said cover, with abutment means on said mirror support when said latch release member is pivoted in one direction to initiate movement of said cover towards open position and cause said lip to flex said flexible member to a position releasing said lip from said ridge.

5. A vanity mirror assembly as defined in claim 4, wherein said flexible member is a strip of resilient material having a main body portion anchored at one end and at the other end having said ridge and terminating in said inclined portion, said ridge being disposed at right angles to the path of said cover and said inclined portion and main body portion being disposed at an acute angle thereto.

6. A vanity mirror assembly as defined in claim 5, including illuminating means on said mirror support including a light bulb and an electric circuit to energize said light bulb, said flexible strip forming part of said circuit, said strip, when said cover is open, occupying a position to close said circuit but being flexed by said lip when said cover is closed to a position opening said circuit.

7. A vanity mirror assembly as defined in claim 3, wherein said flexible member is a strip of resilient material having a main body portion anchored at one end and at the other end having said ridge and terminating in said inclined portion, said ridge being disposed at right angles to the path of said cover and said inclined portion being disposed at an acute angle thereto.

8. A vanity mirror assembly adapted to be mounted on an automobile visor, comprising a mirror, a mirror support having a front surface on which said mirror is mounted, a cover for said mirror, means mounting said cover on said mirror support for sliding movement along a path generally parallel to the plane of said mirror from a closed position overlying and concealing said mirror to an open position exposing said mirror for use, said means mounting said cover on said mirror support comprising laterally spaced, parallel tracks on said cover slidably engaged with laterally spaced, parallel tracks on said mirror support, and means for mounting said mirror support on the automobile visor in a position such that when said visor is moved to a vertical position said tracks are generally vertical, enabling gravity to assist in the movement of said cover to said open position, and abutment means blocking movement of said cover beyond said open and closed positions thereof.

9. A vanity mirror adapted to be mounted on an automobile visor or the like, comprising a mirror, a mirror support having a front surface on which said mirror is mounted, a cover for said mirror, means mounting said cover on said mirror support for sliding movement along a path generally parallel to the plane of said mirror from a closed position overlying and concealing said mirror to an open position exposing said mirror for use, releasable latch means for retaining said cover in its closed position, said releasable latch means comprising a movable member on said mirror support having a latching portion, a lip on said cover adapted to engage said latching portion of said movable member in the closed position of said cover to latch said cover closed, illuminating means on said mirror support including a light bulb and an electric circuit to energize said light bulb, said movable member forming part of said circuit, said movable member, when said cover is open, occupying a position to close said circuit but being moved by said lip to a position opening said circuit when said cover is closed.

* * * * *